US008396950B1

(12) United States Patent
Sandick et al.

(10) Patent No.: US 8,396,950 B1
(45) Date of Patent: *Mar. 12, 2013

(54) METHOD AND APPARATUS FOR THE FAST DETECTION OF CONNECTIVITY LOSS BETWEEN DEVICES IN A NETWORK

(75) Inventors: Haldon Sandick, Durham, NC (US); Matthew Squire, Raleigh, NC (US); Bradley Cain, Cambridge, MA (US); Ian Duncan, Ottawa (CA); Brian Haberman, Hillsborough, NC (US)

(73) Assignee: Rockstar Consortium US LP, Plano, TX (US)

( * ) Notice: Subject to any disclaimer, the term of this patent is extended or adjusted under 35 U.S.C. 154(b) by 1396 days.

This patent is subject to a terminal disclaimer.

(21) Appl. No.: 09/794,317

(22) Filed: Feb. 27, 2001

Related U.S. Application Data

(60) Provisional application No. 60/186,512, filed on Mar. 2, 2000.

(51) Int. Cl.
*G06F 15/16* (2006.01)
*G06F 15/173* (2006.01)

(52) U.S. Cl. .................. 709/223; 709/238; 709/245

(58) Field of Classification Search .......... 709/223–225, 709/227–230, 238, 242, 246, 245; 340/504; 370/242, 252, 395.3, 231, 235, 236, 254, 370/255, 395.1, 395.2
See application file for complete search history.

(56) References Cited

U.S. PATENT DOCUMENTS

| 5,021,949 | A | * | 6/1991 | Morten et al. ............... 709/231 |
| 5,369,570 | A | * | 11/1994 | Parad ............................ 705/8 |
| 5,574,860 | A | * | 11/1996 | Perlman et al. ............ 709/220 |
| 5,583,862 | A | * | 12/1996 | Callon .......................... 370/397 |
| 5,734,642 | A | * | 3/1998 | Vaishnavi et al. ............ 370/255 |
| 5,751,933 | A | * | 5/1998 | Dev et al. ......................... 714/4 |
| 5,764,920 | A | * | 6/1998 | Cook et al. .................... 709/238 |
| 5,805,805 | A | * | 9/1998 | Civanlar et al. ............... 709/220 |
| 5,812,826 | A | * | 9/1998 | McLain, Jr. ..................... 703/27 |
| 5,835,481 | A | * | 11/1998 | Akyol et al. ............. 370/395.53 |
| 5,841,989 | A | * | 11/1998 | James et al. .................. 709/239 |

(Continued)

FOREIGN PATENT DOCUMENTS

| EP | 1089523 A2 * | 4/2001 |
| EP | 1104967 A2 * | 6/2001 |

(Continued)

OTHER PUBLICATIONS

Coltun, R. "The OSPF Opaque LSA Option," RFC 2370, Jul. 1998, pp. 1-15.*

(Continued)

*Primary Examiner* — Melvin H Pollack
(74) *Attorney, Agent, or Firm* — Anderson Gorecki & Rouille LLP

(57) ABSTRACT

A method and apparatus for quickly determining the status of a network device in a network communicates status inquiry messages over the forwarding plane of one network device to at least one neighboring network device. The status inquiry messages indicate the connectivity status with at least one neighboring device. The status inquiry messages are transmitted periodically to the at least one neighboring device. In addition, the network device may communicate an advertisement message over the control plane to discover the at least one neighboring network device prior to the communication of the status inquiry messages over the forwarding plane. The network devices may negotiate communication parameters for the exchange of status inquiry messages with the at least one network device.

46 Claims, 4 Drawing Sheets

U.S. PATENT DOCUMENTS

| | | | | |
|---|---|---|---|---|
| 5,862,338 | A * | 1/1999 | Walker et al. | 709/224 |
| 5,881,142 | A * | 3/1999 | Frankel et al. | 379/167.02 |
| 5,881,246 | A * | 3/1999 | Crawley et al. | 709/238 |
| 5,917,820 | A * | 6/1999 | Rekhter | 370/392 |
| 5,995,503 | A * | 11/1999 | Crawley et al. | 370/351 |
| 5,999,974 | A * | 12/1999 | Ratcliff et al. | 709/224 |
| 6,014,699 | A * | 1/2000 | Ratcliff et al. | 709/224 |
| 6,049,524 | A * | 4/2000 | Fukushima et al. | 370/220 |
| 6,049,828 | A * | 4/2000 | Dev et al. | 709/224 |
| 6,075,776 | A * | 6/2000 | Tanimoto et al. | 370/254 |
| 6,084,859 | A * | 7/2000 | Ratcliff et al. | 370/252 |
| 6,115,385 | A * | 9/2000 | Vig | 370/401 |
| 6,115,748 | A * | 9/2000 | Hauser et al. | 709/234 |
| 6,154,648 | A * | 11/2000 | Comer | 455/426.1 |
| 6,167,452 | A * | 12/2000 | Manning et al. | 709/232 |
| 6,195,688 | B1 * | 2/2001 | Caldwell et al. | 709/208 |
| 6,216,001 | B1 * | 4/2001 | Ghirnikar et al. | 455/435.1 |
| 6,219,708 | B1 * | 4/2001 | Martenson | 709/226 |
| 6,229,540 | B1 * | 5/2001 | Tonelli et al. | 345/735 |
| 6,335,926 | B1 * | 1/2002 | Silton et al. | 370/351 |
| 6,366,561 | B1 * | 4/2002 | Bender | 370/238 |
| 6,396,845 | B1 * | 5/2002 | Sugita | 370/449 |
| 6,401,117 | B1 * | 6/2002 | Narad et al. | 709/223 |
| 6,418,476 | B1 * | 7/2002 | Luciani | 709/238 |
| 6,424,621 | B1 * | 7/2002 | Ramaswamy et al. | 370/230 |
| 6,424,662 | B1 * | 7/2002 | Miki et al. | 370/535 |
| 6,425,005 | B1 * | 7/2002 | Dugan et al. | 709/223 |
| 6,426,947 | B1 * | 7/2002 | Banker et al. | 370/254 |
| 6,427,171 | B1 * | 7/2002 | Craft et al. | 709/230 |
| 6,427,173 | B1 * | 7/2002 | Boucher et al. | 709/238 |
| 6,496,484 | B1 * | 12/2002 | Suzuki | 370/254 |
| 6,510,164 | B1 * | 1/2003 | Ramaswamy et al. | 370/466 |
| 6,510,465 | B1 * | 1/2003 | Bilansky et al. | 709/227 |
| 6,519,257 | B1 * | 2/2003 | Brueckheimer et al. | 370/395.2 |
| 6,560,202 | B1 * | 5/2003 | Bordogna et al. | 370/248 |
| 6,584,548 | B1 * | 6/2003 | Bourne et al. | 711/134 |
| 6,587,438 | B1 * | 7/2003 | Brendel | 370/238 |
| 6,601,093 | B1 * | 7/2003 | Peters | 709/220 |
| 6,606,325 | B1 * | 8/2003 | Cain | 370/410 |
| 6,611,867 | B1 * | 8/2003 | Bowman-Amuah | 709/224 |
| 6,631,419 | B1 * | 10/2003 | Greene | 709/238 |
| 6,633,905 | B1 * | 10/2003 | Anderson et al. | 709/219 |
| 6,650,626 | B1 * | 11/2003 | Cain | 370/256 |
| 6,671,253 | B1 * | 12/2003 | Alexander et al. | 370/217 |
| 6,671,737 | B1 * | 12/2003 | Snowdon et al. | 709/243 |
| 6,680,934 | B1 | 1/2004 | Cain | |
| 6,684,241 | B1 * | 1/2004 | Sandick et al. | 709/220 |
| 6,697,360 | B1 * | 2/2004 | Gai et al. | 370/389 |
| 6,714,544 | B1 * | 3/2004 | Bosloy et al. | 370/395.4 |
| 6,728,249 | B2 * | 4/2004 | Chang | 370/395.3 |
| 6,772,219 | B1 * | 8/2004 | Shobatake | 709/238 |
| 6,772,221 | B1 * | 8/2004 | Ratcliff et al. | 709/238 |
| 6,813,243 | B1 * | 11/2004 | Epps et al. | 370/235 |
| 6,850,987 | B1 * | 2/2005 | McCanne et al. | 709/238 |
| 6,857,026 | B1 * | 2/2005 | Cain | 709/239 |
| 6,871,235 | B1 * | 3/2005 | Cain | 709/239 |
| 6,885,670 | B1 * | 4/2005 | Regula | 370/401 |
| 6,915,457 | B1 * | 7/2005 | Miller | 714/43 |
| 6,928,483 | B1 * | 8/2005 | Cain | 709/238 |
| 6,931,440 | B1 * | 8/2005 | Blumenau et al. | 709/220 |
| 6,952,740 | B1 * | 10/2005 | Cain et al. | 709/238 |
| 6,970,919 | B1 * | 11/2005 | Doi et al. | 709/220 |
| 6,973,034 | B1 * | 12/2005 | Natarajan et al. | 370/232 |
| 6,975,628 | B2 * | 12/2005 | Johnson et al. | 370/389 |
| 6,977,930 | B1 * | 12/2005 | Epps et al. | 370/392 |
| 6,990,103 | B1 * | 1/2006 | Gollamudi | 370/395.31 |
| 7,002,917 | B1 * | 2/2006 | Saleh | 370/238 |
| 7,031,266 | B1 * | 4/2006 | Patel et al. | 370/254 |
| 7,039,687 | B1 * | 5/2006 | Jamieson et al. | 709/220 |
| 7,058,683 | B1 * | 6/2006 | Belissent et al. | 709/206 |
| 7,068,661 | B1 * | 6/2006 | Watt et al. | 370/395.31 |
| 7,203,740 | B1 * | 4/2007 | Putzolu et al. | 709/220 |
| 7,583,665 | B1 * | 9/2009 | Duncan et al. | 370/389 |
| 7,920,595 | B2 * | 4/2011 | Hwang | 370/469 |
| 7,948,968 | B2 * | 5/2011 | Voit et al. | 370/352 |
| 2002/0103921 | A1 * | 8/2002 | Nair et al. | 709/232 |

FOREIGN PATENT DOCUMENTS

EP 1107519 A2 * 6/2001

OTHER PUBLICATIONS

IANA Address Family Number, http://www.isi.edu/in-notes/iana-assignments/address-family-numbers.

Deering, S., "ICMP Router Discovery Messages", RFC 1256, Sep. 1991.

Gellens, R., et al., "Message Submission", RFC 2476, Dec. 1998.

Nichols, K., et al. "Definition of the differentiated Services Field (DS Field) in the IPv4 and IPv6 Headers", RFC 2474, Dec. 1998.

Pusateri, T. "Distance-Vector Multicast Routing Protocol Version 3", Work in Progress RFC 1075, Aug. 2000.

The RFC Archive; www.rfc-archive.org/getrfc.php?rfc=3654; downloaded Apr. 25, 2006.

IETF Dec. 2000 proceedings; 2.7.21 Forwarding and Control Element Separation BOF (forces) Current Meeting Report; www3.ietf.org/proceedings/00dec/00dec-156.htm; downloaded Apr. 25, 2006.

ANDERSON, Requirements for Separation of IP Control and Forwarding, Internet draft, http:/quimby.gnus.org/internet-drafts/draft-anderson-forces-req-01.txt, 7 pages downloaded Jan. 10, 2007.

Forwarding and Control Element Separation (forces); http://www.ietf.org/html.charters/forces-charter.html, 3 pages, downloaded Jan. 23, 2007.

Forwarding and Control Element Separation (ForCES) Working Group Supplemental Home Page, http://www.sstanamera.com/forces/index.html, 3 pages downloaded Jan. 23, 2007.

Requirements for Separation of IP Control and Forwarding, http://www.rfc-archive.org/getrfc.php?rfc=3654, 18 pages downloaded Apr. 25, 2006.

Gaviria, et al, Management and Control Plane Techniques in Self-Aware Networks, The University of Arizona, no date given.

Ashwood-Smith; Generalized Multi-Protocol Label Switching (GMPLS) Architecture; internet draft, http://tools.ief.org/html/draft-ietf-ccamp-gmpls-architecture-00; 51 pages downloaded Jan 23, 2007.

Katz, Bidirectional Forwarding Detection, internet draft, http://tools.ietf.org/html/draft-ietf-bfd-base-oo, 45 pages downloaded Jan. 15, 2007.

* cited by examiner

METHOD AND APPARATUS FOR THE FAST DETECTION OF CONNECTIVITY LOSS BETWEEN DEVICES IN A NETWORK

PRIORITY

This application claims priority from provisional U.S. patent application Ser. No. 60/186,512, filed Mar. 2, 2000, entitled "FAST LIVENESS PROTOCOL (FLIP)", the disclosure of which is incorporated herein, in its entirety, by reference.

FIELD OF THE INVENTION

The present invention relates generally to communication systems, and more particularly, to propagating status inquiry messages in a network for determining the status of network devices.

BACKGROUND OF THE INVENTION

Many applications and services communicate information over computer networks, such as the Internet, in the form of data packets. Network devices (e.g., routers and switches) process and forward data packets to neighboring network devices in the network according to addressing information contained therein. Logic contained in the network devices is responsible for processing and forwarding received protocol data packets. This logic includes the "forwarding plane" and the "control plane". The forwarding plane forwards protocol data packets relatively quickly because minimal data processing is performed. Conversely, the control plane forwards data packets (e.g., protocol data packets) much slower because the packets require additional processing (i.e., they must be queued or scheduled) before they are forwarded.

Network devices use routing protocols (e.g., OSPF or IS-IS Hello) to both determine network routes, and to store such routes in local routing tables. Accordingly, upon receipt of a packet, a receiving network device accesses the routing table to determine the route to use for forwarding the packets. During normal error free transmission on a computer network, packets are successfully forwarded and received between network devices. Undesirably, however, interruptions of data flow often occur causing network devices to lose connectivity with neighboring network devices in the network. In response to this problem, routing protocols commonly include "keep-alive" services to detect the loss of connectivity between neighboring network devices. Specifically, keep-alive services typically include "hello" messages that are communicated via the links of neighboring network devices to determine if such neighboring devices are properly operating.

Existing hello messages are typically processed by the control plane and thus, produce a significant communication delay (e.g., from a few seconds to tens of seconds) before a network device is alerted of a loss of connectivity with a neighbor. Such delay often inhibits a network device from recovering from a loss of connectivity, commonly causing data to be lost. For example, many applications and services, such as packetized voice, require notification of a loss of connectivity almost instantaneously (e.g., on the order of less than about 50-200 milliseconds). Accordingly, such a relatively long delay does not adequately provide the intended safeguards of the keep-alive services.

SUMMARY OF THE INVENTION

In accordance with one aspect of the invention, a method and apparatus for quickly determining the status of a network device in a network communicates status inquiry messages over the forwarding plane of one network device to at least one neighboring network device. The status inquiry messages indicate the connectivity status with at least one neighboring network device.

In various embodiments, the status inquiry messages are transmitted periodically to the at least one neighboring network device. In addition, the network device may communicate an advertisement message over the control plane to discover the at least one neighboring network device prior to the communication of the status inquiry messages over the forwarding plane. Following the identification of the at least one neighboring network device, the network devices may negotiate communication parameters for the exchange of status inquiry messages with the at least one network device. Among other things, the network device may be a switch or a router and the network may be a local area network (LAN), wide area network (WAN), or the Internet.

Preferred embodiments of the invention are implemented as a computer program having a computer usable medium with computer readable program code thereon. The computer readable code may be read and utilized by a computer system in accordance with conventional processes.

BRIEF DESCRIPTION OF THE DRAWINGS

The foregoing description and advantages of the invention will be appreciated more fully from the following further description thereof with reference to the accompanying drawings wherein.

DESCRIPTION OF ILLUSTRATIVE EMBODIMENTS

In illustrative embodiments of the invention, status inquiry messages are forwarded via the forwarding plane of a network device to a neighboring network device to quickly determine the connectivity status between the devices. Details and examples of illustrative embodiments are discussed below.

It should also be noted that the term "network device" is used herein to broadly represent any type of device that functions to process and/or forward data packets to neighboring devices in a network. Such devices may include, among other things, hosts, routers, multiplexers, computer systems, and switches. In illustrative embodiments, network devices discussed herein have both a control plane and a forwarding plane.

Figure 1:
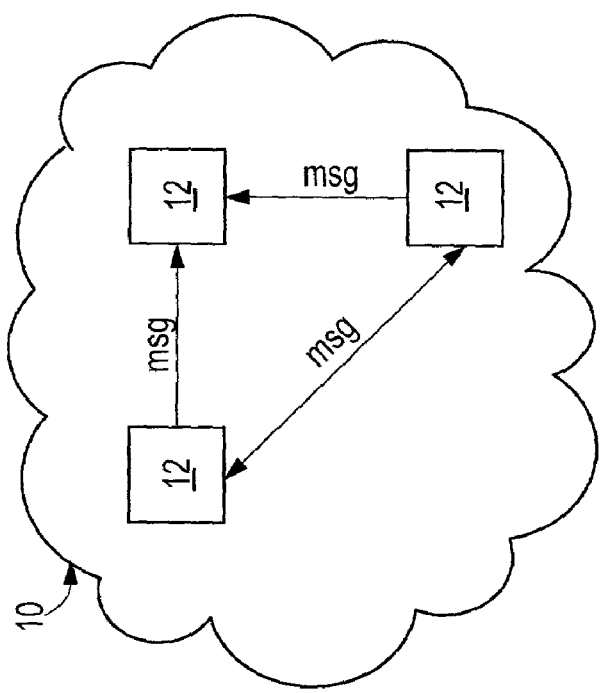
FIG. 1 schematically shows a network arrangement that may be used with illustrative embodiments of the invention.

FIG. 1 shows an IP subnet 10 that may be used with illustrative embodiments of the invention. Specifically, the subnet 10 includes a plurality of neighboring network devices 12. Each of the network devices 12 include, among other things, interfaces for communicating with each other. In illustrative embodiments, the network devices 12 are routers, such as the ACCELLAR™ Router, available from Nortel Networks Limited of Brampton, Ontario, Canada. The subnet 10 may be coupled with another network, such as the Internet. The network devices 12 communicate their operational status via messages in accordance with illustrative embodiments described herein.

Figure 2:
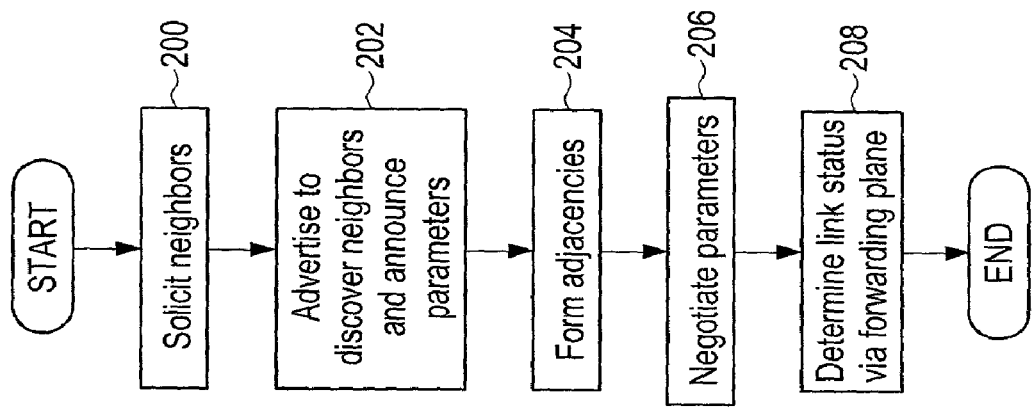
FIG. 2 shows an illustrative process of determining the connectivity status in the network shown in FIG. 1.

FIG. 2 shows an illustrative process utilized by a network device 12 in the IP subnet 10 for determining connectivity status with its neighboring network devices 12. To accomplish this task, a plurality of different types of messages are used. One type of message is an advertisement message, which is used for discovering neighboring network devices 12 and transmitting preliminary communication parameters to such network devices 12. A second type of message is a status inquiry message, which is a simple fixed format message exchanged between the network devices 12 for discovering the status of a network device 12. Status inquiry messages have the capability of operating at high frequencies for permitting network devices 12 to rapidly detect losses of connectivity.

The process in FIG. 2 begins at step 200, in which one of the network devices 12 first becomes initialized (i.e., when the network device becomes active). Specifically, when first initialized, the one network device 12 multicasts a solicitation message to neighboring network devices on the IP subnet 10.

The process continues to step 202, in which another network device 12 (the "inquiring network device 12"), after receiving the solicitation message from the noted network device, sends one or more advertisement messages (via its control plane) to both discover neighboring network devices 12 on the IP subnet 10, and to announce preliminary communication parameters for the status inquiry messages. The initial advertisement messages from the inquiring network device 12 are sent immediately upon receiving the solicitation message, while subsequent advertisement messages are sent periodically (discussed in further detail below). In illustrative embodiments, the inquiring network device 12 transmits one advertisement message from each of its interfaces.

The process continues to step 204, in which "adjacencies" are deemed to be formed between the inquiring network device 12 and each discovered neighboring network device 12. In illustrative embodiments, the inquiring network device 12 considers an adjacency to be formed when it reads its IP address in an advertisement message received from a neighboring network device 12. After an adjacency is established, the process continues to step 206, in which the inquiring network device 12 negotiates common communication parameters for status inquiry messages to be transmitted to and received from each located adjacent network device 12. This negotiation preferably is an agreement on the lowest common denominator (discussed below) of each preliminary communication parameter of the inquiring network device 12 and the adjacent network device 12. Each network device 12 that is adjacent to the inquiring network device 12 can have a different set of communication parameters with the inquiring network device 12.

Once operating parameters have been negotiated and agreed upon, the process continues to step 208, in which the connectivity status between the adjacent network devices 12 is determined. Specifically, status inquiry messages are exchanged (e.g., via a unicast) between the adjacent network devices 12 via their respective forwarding planes to determine connectivity status. In illustrative embodiments, the status inquiry messages are transmitted at a much higher frequency than the advertisement messages. Details of the various steps of this process are discussed below with reference to FIGS. 3-7.

Figure 3:
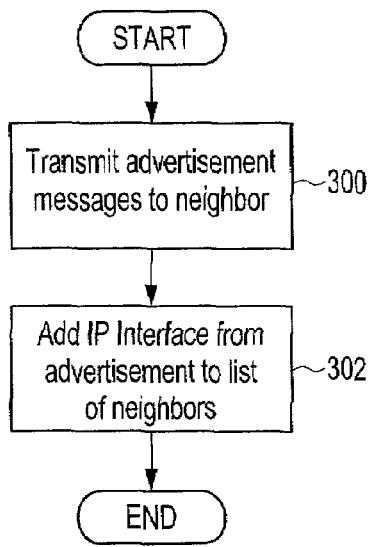
FIG. 3 shows an illustrative process describing in more detail the neighbor discovery function of the advertisement protocol shown in FIG. 2.

FIG. 3 shows an illustrative process describing in more detail the neighbor discovery function of the advertisement messages shown in step 202 of FIG. 2. The process begins at step 300, in which the inquiring network device 12 multicasts advertisement messages on the IP subnet 10 over each of its IP interfaces. These advertisement messages advertise both the inquiring network device's 12 support of the process of FIG. 2, and its currently configured preliminary communication parameters.

As discussed with respect to step 202 above, an advertisement message from the inquiring network device 12 sent in response to a solicitation message is sent immediately to a neighbor on the subnet, while subsequent advertisement messages from the inquiring network device 12 are periodically transmitted at predefined time intervals (referred to herein as an "AdvertisementInterval") at relatively low frequencies, and with a small amount of jitter. A random jitter factor is included to ensure that the advertisement messages are sent at different times, thus preventing the network devices 12 from becoming overloaded with receiving multiple messages transmitted at the same time. In illustrative embodiments, the advertisement interval is about 600 seconds. Of course, this interval value is an example and thus, not intended to limit various embodiments of the invention. This interval is not applicable when the network device is first initialized.

Once one of the advertisement messages is received by a neighboring network device 12, the process continues to step 302, in which the inquiring network device's IF interface (over which the received advertisement message was sent) is added to a list of IF interfaces contained in the neighboring network device's own advertisement to be transmitted to the inquiring network device 12. Thus, the inquiring network device 12 is deemed to have been "discovered" by the neighboring network device 12. It should be noted that the list of neighbor IF interfaces is for the subnet that transmitted the advertisement only and not for any other subnet.

Figure 4:
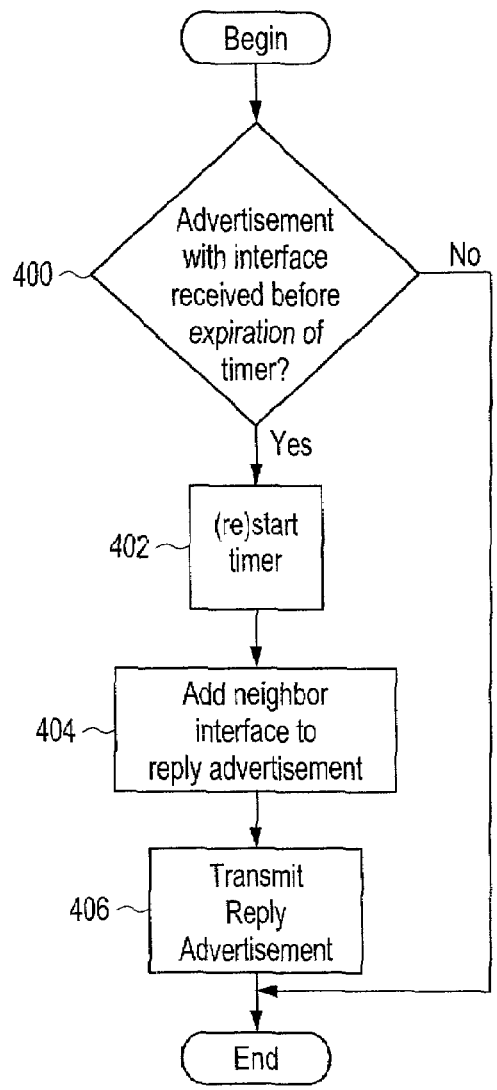
FIG. 4 shows an illustrative process describing in more detail how adjacencies are formed between neighboring network devices shown in FIG. 2.

FIG. 4 shows an illustrative process describing in more detail how an adjacency may be formed between the inquiring network device 12 and a neighboring network device 12 as shown in step 204 of FIG. 2. The process begins at step 400, in which it is determined if an advertisement having the IF interface of the inquiring network device 12 is received by the inquiring network device 12 (from the neighboring network device 12) before expiration of an AdvertisementDeadInterval timer. More specifically, the AdvertisementDeadInterval timer times a predefined time period (referred to as "AdvertisementDeadInterval period") to check the status of an adjacency. In particular, as shown below, if the inquiring network device 12 does not receive an advertisement (with the IF interface of the inquiring network device 12) by the end of the AdvertisementDeadInterval period, then an adjacency is deemed to be terminated. Accordingly, in such case, connectivity is considered to be lost between the two network devices 12. Status inquiry messages (see FIG. 6) thus no longer are transmitted to the neighboring network device 12. The inquiring network device 12 nevertheless continues to transmit advertisements over the interface for the neighboring network device 12 in an effort to discover and/or establish another adjacency. These new advertisements, however, do not include the IP interface of the neighboring network device 12.

Returning to the query in step 400, if no such advertisement is received before the end of the AdvertisementDeadInterval period, then the process ends. Conversely, if such advertisement is received in that time period, then the process continues to step 402, in which the timer is started (if this is the first such advertisement), or restarted (if this is not the first such advertisement). The neighbor network device 12 IP interface then is added to a reply advertisement (step 404), which then is transmitted to the neighboring network device 12 (step 406). After receipt of the reply advertisement, the neighboring network device 12 also executes the process shown in FIG. 4.

In illustrative embodiments, the value of the AdvertisementDeadInterval is larger than the AdvertisementInterval (this interval being noted above). For example, the AdvertisementDeadInterval may be about twice the value of the AdvertisementInterval.

As noted above, in addition to neighbor discovery and establishing adjacency, advertisement messages are also used to communicate various preliminary communication parameters. For example, the following communication parameters for determining connectivity status may be used: the StatusInquiryInterval and the PeerDeadInterval. The StatusInquiryInterval and the PeerDeadInterval define the communication parameters utilized by adjacent network devices 12 when transmitting status inquiry messages. Specifically, the StatusInquiryInterval indicates how often (in terms of milliseconds) status inquiry messages will be sent by a network device. For example, if the StatusInquiryInterval is three milliseconds, then a given network device should send status inquiry messages at least every three milliseconds. The PeerDeadInterval indicates how long a network device should wait (in terms of milliseconds) from the last received status inquiry message before declaring a loss of connectivity. The value of the PeerDeadInterval illustratively is larger than the StatusInquiryInterval. For example, the PeerDeadInterval may be three times the value of the StatusInquiryInterval.

Figure 5:
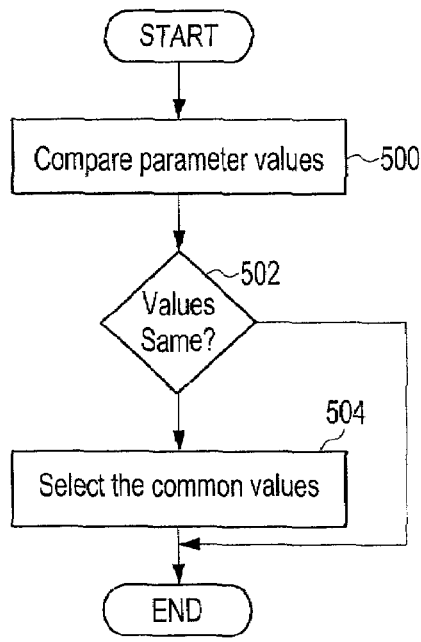
FIG. 5 shows an illustrative process describing in more detail the negotiation of operating parameters for two adjacent network devices shown in FIG. 2.

Of course, it is possible for two adjacent network devices to be configured with different preliminary values for their communication parameters. These values must be agreed upon before the transmission of status inquiry messages can begin. FIG. 5 shows an illustrative process describing in more detail the negotiation of one communication parameter (e.g., the StatusInquiryInterval or the PeerDeadInterval) for two adjacent network devices 12 on IP subnet 10 as shown in step 206 of FIG. 2. Continuing with the above discussion, the process is described in terms of the inquiring network device 12 and the neighboring network device 12.

The process begins at step 500, in which the value of a parameter (the StatusInquiryInterval in succeeding examples) received from the inquiring network device 12 is compared to the value of the same parameter in the neighboring network device 12. If the parameter values are determined to be the same at step 502, then such value is used as an agreed on communication parameter, thus ending the process.

Conversely, if the parameter values are determined to be different at step 502, then the process continues to step 504, in which a common value must be selected. In illustrative embodiments, the common value selected is the larger of the two parameter values, thus ending the process. Specifically, it is preferred that the larger parameter value be selected (instead of the smaller one) in illustrative embodiments to accommodate environments where one of the two network devices 12 cannot operate at the same speed as the other device. Thus, the faster device operates at a slower rate to accommodate the slower device. This process was referred to above as using the lowest common denominator. Of course, the different parameters values (StatusInquiryInterval or PeerDeadInterval) may be selected in a different manner. Accordingly, selecting the larger value is illustrative only and is not intended to limit the scope of the invention.

In a manner to other timing intervals discussed above, each network device 12 may apply a jitter factor to the StatusInquiryInterval and the PeerDeadInterval. For example, the actual parameters used may between 75% and 100% of the selected values. This ensures that the status inquiry messages are not sent at the same time, thus avoiding overloading a receiving network device 12.

Figure 6:
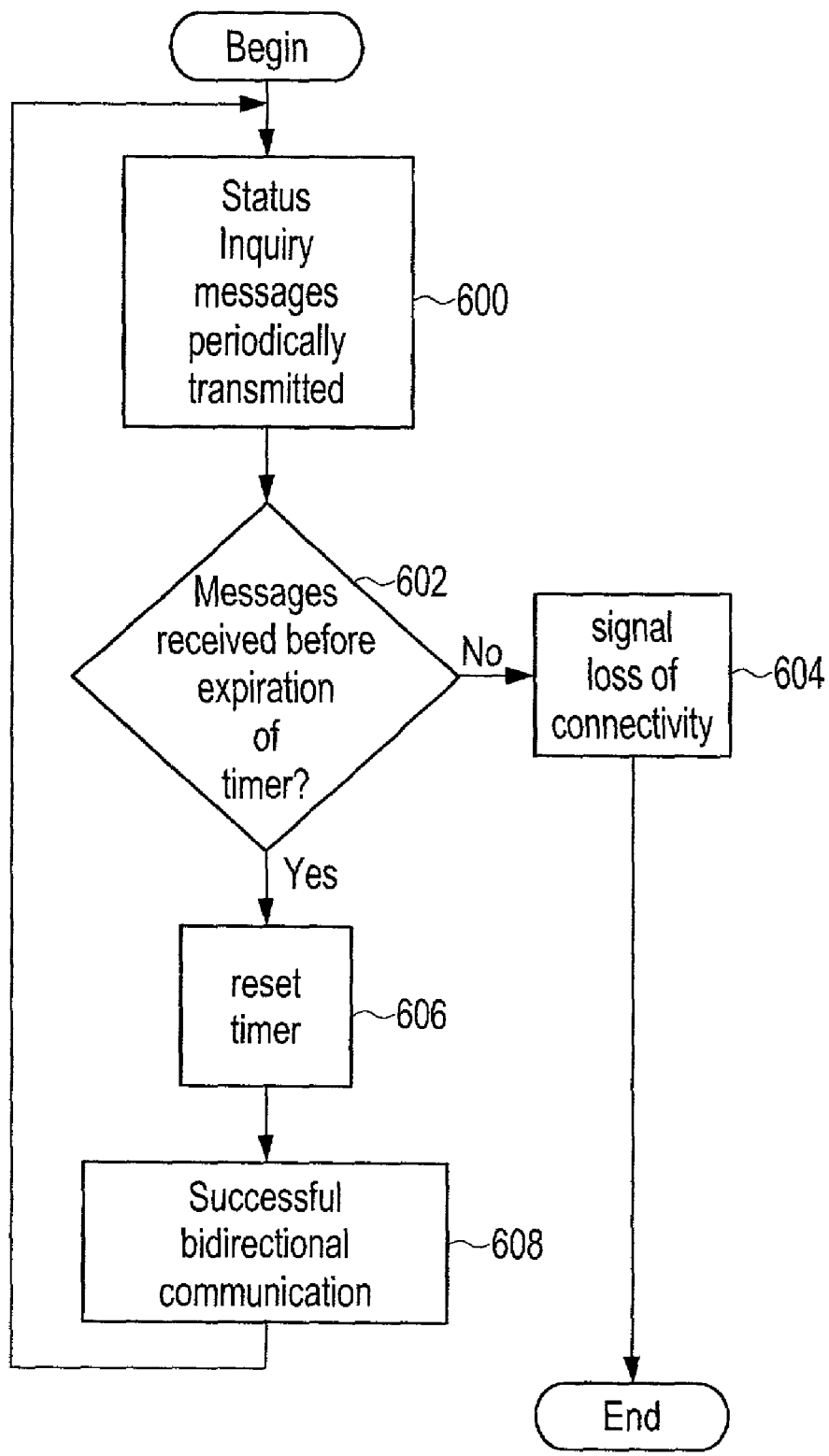
FIG. 6 shows an illustrative process of checking the connectivity status of adjacent neighboring network devices.

FIG. 6 shows an illustrative process of checking the connectivity status of adjacent neighboring network devices 12, referenced at least in part in step 208 of FIG. 2. In illustrative embodiments, this entire process is executed in the forwarding plane of each of the network devices 12 executing this process. The connectivity status is checked every set time interval (discussed below) to ensure that a neighboring network device has been in communication within a reasonable time interval. Details are discussed below.

As discussed above with regard to FIG. 2, the process of FIG. 6 uses status inquiry messages. In illustrative embodiments, each status inquiry message is carried in an IP packet having a header with the address of a network device to receive the message, and a body having a four bit field. The first bit is the StatusInquiryHeard bit, which indicates if the network device 12 sending the message has received a status inquiry message from the network device 12 receiving the message. In some cases, the StatusInquiryHeard bit is set only if the message is received before expiration of PeerDeadInterval timer (discussed below). The StatusInquiryHeard bit has two states, namely "on" or "off." A status inquiry message is considered to be validated when the StatusInquiryHeard bit is set to be "on."

In a manner similar to other processes discussed herein, this process is described from the point of view of the inquiring network device 12 and its neighboring network device 12. Accordingly, an adjacency is deemed to have been previously established between such network devices 12. In such case, prior to execution of this process, the inquiring network device 12 and neighboring network device 12 (via their respective forwarding planes) have each transmitted validated status inquiry messages to each other. This may have occurred by the inquiring network device 12 transmitting an unvalidated status inquiry message to the neighboring network device 12, and the neighboring device 12 responding with a validated status inquiry message. Execution of the process of FIG. 6 is begun by the inquiring network device 12 after receipt of the validated status inquiry message from the neighboring network device 12. Receipt of a validated status inquiry message means that successful bi-directional communication has been established and/or maintained.

The process begins at step 600, in which the inquiring network device 12 periodically transmits validated status inquiry messages to the neighboring network device 12 via the IP interface logically connected with the neighboring network device 12. In illustrative embodiments, status inquiry messages are transmitted via such IP interface once every time interval equal to the StatusInquiryInterval. For example, this time interval may be three milliseconds. Of course, the inquiring network device 12 may send status inquiry messages through other of its IP interfaces to other network devices 12 in the subnet 10. As noted above, if an adjacency is deemed to have been terminated, then no more status inquiry messages are transmitted.

The process then continues to step 602, in which it is determined if a validated status inquiry message has been received before expiration of a given timer (referred to herein as a PeerDeadInterval timer). More particularly, this timer is started upon receipt of the last validated status inquiry message received from the neighbor network device 12. If a subsequent validated status inquiry message is not received from the neighboring network device 12 within the time period specified by the timer, then (as shown in this figure) connectivity is deemed to have been lost.

Accordingly, if no validated status inquiry message has been received before the expiration of the timer, then the process continues to step 604, in which loss of connectivity is considered to have occurred. In such case, a loss of connectivity is signaled, thus ending the process. For example, the inquiring network device 12 may signal the loss of connectivity to an application such as a routing protocol, which can respond appropriately. No additional status inquiry messages thus are to be transmitted until an adjacency is established. Connectivity may be reestablished, if desired, by the methods already discussed. In particular, connectivity may be reestablished by the discovery/adjacency process, and then through the exchange of status inquiry messages.

Conversely, if at step 602 a validated status inquiry message has been received, then the process continues to step 604, in which the timer is reset. In illustrative embodiments, the time period that the timer is reset is greater than the StatusInquiryInterval. For example, if the StatusInquiryInterval is three milliseconds, the time period of this timer may be twelve milliseconds.

The process continues to step 608 in which successful bi-directional communication is deemed to have been maintained. The process then loops back to step 600, in which validated status inquiry bits are periodically transmitted to the neighboring network device 12.

To summarize, the connectivity status between neighboring network devices 12 can be in any one of three states. Namely, the connectivity may be in an up state, a down state, or an unknown state (i.e., the connectivity status is not known). When in the up state, status inquiry messages are transmitted from the receiving network device 12 with the StatusInquiryHeard bit set to "on." When in the down state, no status inquiry messages are transmitted. When in the unknown state, status inquiry messages are transmitted from the receiving network device with the StatusInquiryHeard bit set to "off." This unknown state is deemed to occur between the time that an adjacency is first established, and the time that a validated status inquiry message is received from a neighboring network device 12.

In another embodiment, instead of a StatusInquiryHeard bit, status inquiry messages may contain an identification field that contains a unique, non-decreasing, and unsigned 32 bit number. An example of how such a number would be generated is from a 32 bit time of day (TOD) clock. Similar to the process in the previous embodiment discussed above, the connectivity status between neighboring network devices 12 can be in any one of three states. Namely, the connectivity is in an up state when status inquiry messages with the same 32 bit number found in the sending network device 12 is transmitted from the receiving network device 12. When in the down state, no status inquiry messages are transmitted. When in the unknown state, status inquiry messages are transmitted from the receiving network device with a different 32 bit numbers than that found in the sending network device 12.

In an illustrative embodiment, the aforementioned method for determining connectivity status is implemented as hardware (e.g., line cards, application specific integrated circuits, FPGAs, and/or digital signal processors), or other related components in the network device 12. Moreover, as noted above, the process shown in FIG. 6 is executed substantially entirely in the forwarding plane of each network device 12, while the processes shown in FIGS. 3-5 illustratively are executed in the control plane of each network device 12. Accordingly, the status inquiry messages can be transmitted at much higher frequencies than other types of messages, thus supporting applications requiring rapid status information, such as packetized voice.

Figure 7:
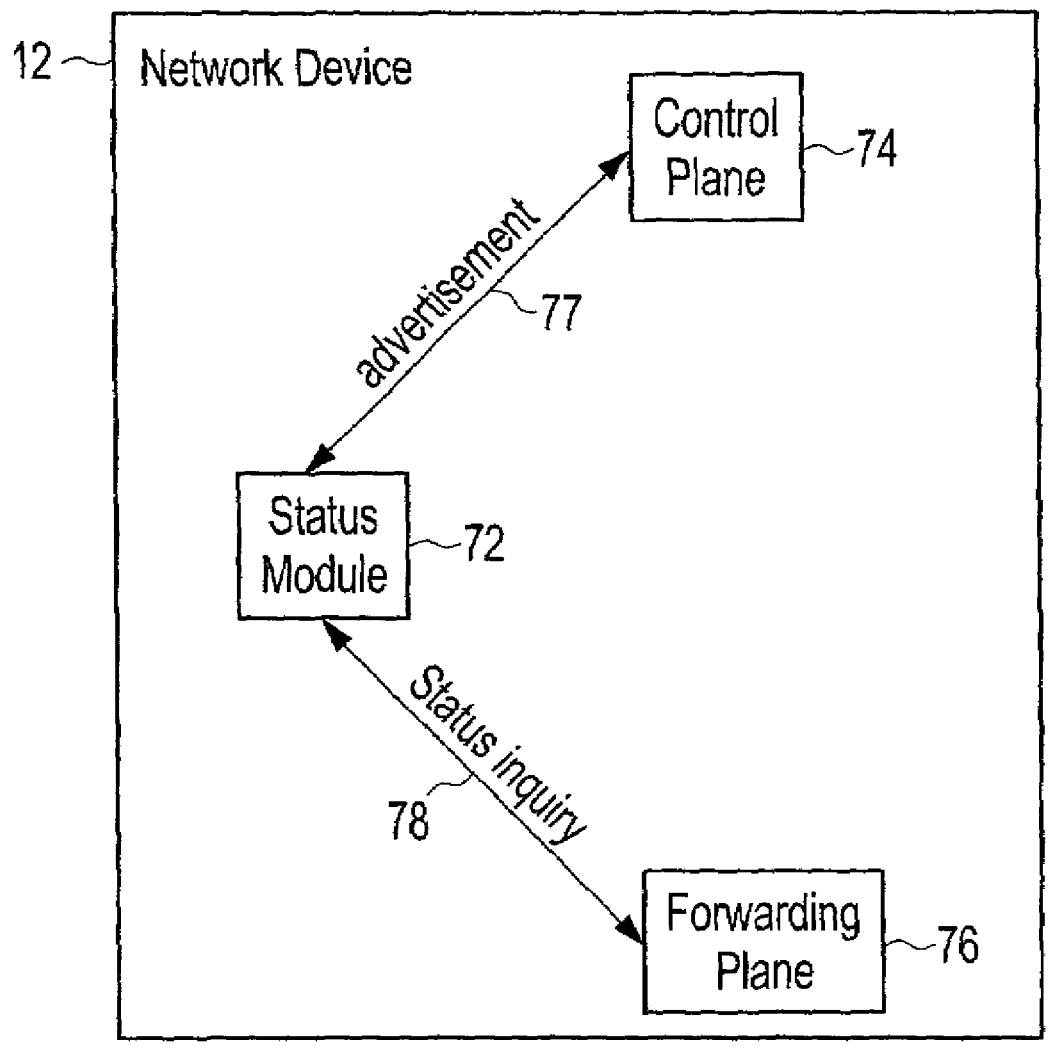
FIG. 7 schematically shows a network devices that may implement preferred embodiments of the invention.

FIG. 7 schematically shows one of the network devices 12 (as shown in FIG. 1), which contains logic for processing messages in accordance with FIGS. 2-6. The network device 12 includes a status module 72 for executing the process shown in FIG. 2, a control plane 74, and a forwarding plane 76. Logic within the status module 72 transmits messages via advertisement messages 77 or status inquiry messages 78. The status module 72 forwards advertisement messages 77 via the control plane 74, and forwards the status inquiry messages 26 to the neighboring network devices 12 (see FIG. 1) via the forwarding plane 76. As previously noted, by enabling the status module 72 to forward the status inquiry messages 78 over the forwarding plane 76, high frequency rates required to send and receive the status inquiry messages 78 can be achieved. Of course, this embodiment is illustrative only and is not intended to limit the scope of the invention. Other illustrative embodiments may be implemented without a status module. In such embodiments, the communication of the advertisement messages and the status inquiry messages is done directly between the control plane and the forwarding plane.

The aforementioned embodiments may also be implemented at least in part in any conventional computer programming language. For example, some embodiments may be implemented in a procedural programming language (e.g., "C") or an object oriented programming language (e.g., "C++").

In an alternative embodiment, the disclosed apparatus and method may be implemented as a computer program product for use with a computer system. Such implementation may include a series of computer instructions fixed on a tangible medium, such as a computer readable medium (e.g., a diskette, CD-ROM, ROM, or fixed disk). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made that will achieve some of the advantages of the invention without departing from the true scope of the invention. These and other obvious modifications are intended to be covered by the appended claims.

What is claimed is:

1. A method including the steps of:
communicating a status by a network device to a neighboring network device in a network, the network device having a control plane and a forwarding plane, wherein the forwarding plane comprises a processing pathway in which packets are forwarded based on previously resolved forwarding information stored within the network device, and wherein the control plane comprises a processing pathway in which packets are processed so that forwarding information is resolved by communicating with other devices in the network, the step of communicating including the step of forwarding a connectivity status message indicating the status of the network device to the neighboring network device, the status message generated and communicated using the forwarding plane of the network device.

2. The method of claim 1, wherein the status message also includes information associated with the neighboring network device, including information regarding receipt of status inquiries from the neighboring network device.

3. The method according to claim 1, further including the steps of:
communicating an advertisement message including communication parameters to the neighboring network device using the control plane of the network device to permit discovery of the network device by the neighboring device.

4. The method according to claim 3 wherein the communication parameters include a frequency for forwarding the status messages.

5. The method according to claim 3 wherein the communication parameters include an interval defining a minimum frequency for re-transmission of status messages for indication of connectivity between the network device and the neighboring network device.

6. The method according to claim 3 wherein both the status message and the advertisement message are periodically re-transmitted and wherein the advertisement message is re-transmitted at a lower frequency than the status message.

7. The method of claim 1 wherein the network is an Internet Protocol (IP) subnet.

8. A method including the steps of:
receiving, at a network device in a network, a connectivity status message generated and communicated by a forwarding plane of a neighboring network device, the status message including data indicating the status of the neighboring network device, wherein the forwarding plane comprises a processing pathway in which packets are forwarded based on previously resolved forwarding information stored within the neighboring network device.

9. The method of claim 8, wherein the status message also includes information associated with the neighboring network device including information regarding receipt of status inquiries from the network device.

10. The method of claim 8 including the step of receiving, at the network device, an advertisement message from a control plane of the neighboring network device, wherein the advertisement message enables the network device to discover the neighboring device, and wherein the advertisement message includes communication parameters associated with the neighboring network device.

11. The method of claim 10, wherein a receive frequency of the status messages at the network device is higher than a receive frequency of the advertisement messages at the network device.

12. The method according to claim 10 wherein the communication parameters include a frequency for forwarding the status messages.

13. The method according to claim 10 wherein the communication parameters include an interval identifying a time period between receipts of status messages at which it is determined that connectivity between the neighboring network device and the network device is lost.

14. The method according to claim 8 including:
upon receipt of the status message, starting a timer;
determining that a connection with the neighboring network device is lost if another status message is not received before the expiration of the timer.

15. The method of claim 8 wherein the network is an IP subnet.

16. A network device comprising:
a control plane and a forwarding plane, wherein the forwarding plane comprises a processing pathway in which packets are forwarded based on previously resolved forwarding information stored within the network device, and wherein the control plane comprises a processing pathway in which packets are processed so that forwarding information can be resolved by communicating with other devices in the network, the forwarding plane generating and communicating, to a neighboring network device, a connectivity status message indicating the status of the network device.

17. The network device of claim 16, wherein the status message also includes information associated with the neighboring network device including information regarding receipt of status inquiries from the neighboring network device.

18. The network device of claim 16, wherein the control plane of the network device is for forwarding advertisement messages to the neighboring network device to enable discovery of the network device, wherein the advertisement messages include communication parameters associated with the network device.

19. A network device of claim 18, wherein the communication parameters include a frequency for forwarding the status messages.

20. The network device of claim 18 wherein the communication parameters include an interval identifying a time period between status messages at which it is determined that connectivity between the neighboring network device and the network device is lost.

21. The network device of claim 18 wherein both the status message and the advertisement message are periodically re-transmitted and wherein the advertisement message is re-transmitted at a lower frequency than the status message.

22. A network including the network device of claim 16, wherein the network is an Internet Protocol (IP) subnet.

23. A network device including:
a control plane and a forwarding plane, wherein the forwarding plane comprises a processing pathway in which packets are forwarded based on previously resolved forwarding information stored within the network device, and wherein the control plane comprises a processing pathway in which packets are processed so that forwarding information can be resolved by communicating with other devices in the network, the forwarding plane receiving a connectivity status message generated and communicated by a forwarding plane of a neighboring network device, the status message including data indicating the status of the neighboring network device.

24. The network device of claim 23 wherein the status message also includes information associated with the network device including information regarding receipt of status inquiries from the neighboring network device.

25. The network device of claim 23 wherein the control plane is adapted to receive an advertisement message from a control plane of a neighboring network device, wherein the advertisement message enables the network device to discover the neighboring network device, and wherein the advertisement message includes communication parameters associated with the neighboring network device.

26. The network device of claim 25, wherein a receive frequency of the status messages at the network device is higher than a receive frequency of the advertisement messages at the network device.

27. The network device of claim 25 wherein the communication parameters include a frequency for forwarding the status messages.

28. The network device of claim 25 wherein the communication parameters include an interval identifying a time period between receipts of status messages at which it is determined that connectivity between the neighboring network device and the network device is lost.

29. A network including the network device of claim 23, wherein the network is an IP subnet.

30. A computer program product for use on a network device in a network, the network device having a forwarding plane and a control plane, wherein the forwarding plane comprises a processing pathway in which packets are forwarded based on previously resolved forwarding information stored within the network device, and wherein the control plane comprises a processing pathway in which packets are processed so that forwarding information can be resolved by communicating with other devices in the network, the computer program product comprising a computer usable medium having computer readable program code thereon, the computer readable program code comprising:
   program code that communicates the status of the network device to the network, including program code that generates and communicates a connectivity status message to a neighboring network device via the forwarding plane, the program code operating independent of the control plane,
   the status message including data indicating the status of the network device.

31. The computer program product of claim 30, wherein the status messages includes information associated with the neighboring network device including information regarding receipt of status inquiries from the neighboring network device.

32. The computer program product as defined by claim 30, further comprising program code for communicating an advertisement message over the control plane of the network device to enable discovery of the network device by the neighboring network device, the advertisement message including communications parameters associated with the network device.

33. The computer program product as defined by claim 32 wherein both the status message and the advertisement message are periodically retransmitted, and wherein the status messages are retransmitted at a higher frequency than the advertisement messages.

34. The computer program product as defined by claim 30, wherein the network device is one node in an Internet Protocol subnet.

35. An apparatus for communicating a status of a network device in a network, comprising:
   a forwarding plane including a processing pathway in which packets are forwarded based on previously resolved forwarding information stored within the network device;
   a control plane including a processing pathway in which packets are processed so that forwarding information is resolved by communicating with other devices in the network; and
   means for communicating a connectivity status message over the forwarding plane to a neighboring network device, the status message including data indicating the status of the network device and being generated by the forwarding plane.

36. The apparatus of claim 35 wherein the status message includes information associated with the neighboring network device including information regarding receipt of status inquiries from the neighboring network device.

37. The apparatus as defined by claim 35 further comprising means for forwarding an advertisement message to the neighboring network device using the control plane to enable discovery of the network device by the neighboring network device, the advertisement message including communication parameters associated with the network device.

38. The apparatus as defined in claim 37 wherein the communication parameters include a frequency for forwarding the status message.

39. The apparatus according to claim 37 wherein the communication parameters include an interval identifying a time period between receipts of status messages at which it is determined that connectivity between the neighboring network device and the network device is lost.

40. The apparatus of claim 37, wherein the status messages and advertisement messages are periodically re-transmitted, and wherein the status message is re-transmitted at a higher frequency than the advertisement message.

41. A method comprising:
   forwarding, using a control plane of a network device, an advertisement message to a neighboring network device, the advertisement message including communication parameters associated with the network device;
   receiving, by the network device in response to the advertisement message, a reply advertisement message from the neighboring network device, the reply advertisement message including communication parameters associated with the neighboring network device;
   generating and communicating, using a forwarding plane of the network device, connectivity status messages to the neighboring network device, the status messages indicating a status of the network device,
   wherein the forwarding plane comprises a processing pathway in which packets are forwarded based on previously resolved forwarding information stored within the network device, and wherein the control plane comprises a processing pathway in which packets are processed so that forwarding information can be resolved by communicating with other devices in the network.

42. The method according to claim 41, further including the step of the neighboring network device and network device negotiating a transmission frequency for re-transmission of the status messages including information regarding receipt of status inquiries from the neighboring network device.

43. The method according to claim 41, wherein the status messages include information associated with the neighboring network device.

44. A method comprising the steps of:

receiving, at a network device in a network, from a control plane of a neighboring network device, an advertisement message including communication parameters associated with the neighboring network device;

replying to the advertisement message to indicate discovery of the neighboring network device; and receiving, from a forwarding plane of the neighboring network device, connectivity status messages, the status messages indicating a status of the neighboring network device and being communicated by the forwarding plane, wherein the forwarding plane comprises a processing pathway in which packets are forwarded based on previously resolved forwarding information stored within the neighboring network device, and wherein the control plane comprises a processing pathway in which packets are processed so that forwarding information can be resolved by communicating with other devices in the network.

45. The method of claim 44 including the steps of:

determining, in response to the communication parameters associated with the neighboring network device and communication parameters associated with the network device, a negotiated transmission frequency of the status messages; and determining that a connection to the neighboring network device has failed if a rate of receipt of the status messages falls below the negotiated transmission frequency.

46. The method of claim 44, wherein the status messages include information associated with the network device including information regarding receipt of status inquiries from the network device.

* * * * *